United States Patent [19]

Bornfleth

[11] 3,774,791
[45] Nov. 27, 1973

[54] APPARATUS FOR PRODUCING, PROCESSING AND MANIPULATING FILTER ROD SECTIONS

[75] Inventor: Ulrich Bornfleth, Hamburg, Germany

[73] Assignee: Hauni-Werke Körber & Co., KG, Hamburg, Germany

[22] Filed: May 21, 1971

[21] Appl. No.: 145,843

[30] Foreign Application Priority Data
May 26, 1970   Germany.................. P 20 25 657.9

[52] U.S. Cl.................. 214/302, 131/84, 302/2 R, 214/16.4 C
[51] Int. Cl............................................. B65b 35/00
[58] Field of Search...................... 214/16.4 C, 302; 131/84; 302/2 R; 198/37

[56] References Cited
UNITED STATES PATENTS

| 3,527,369 | 9/1970 | Bornfleth et al. | 214/301 |
| 3,486,647 | 12/1969 | Seragnoli | 214/302 |
| 3,411,827 | 11/1968 | Rupert | 302/2 R |
| 3,519,143 | 7/1970 | Kochalski et al. | 214/6 N |
| 3,075,630 | 1/1963 | Fisk | 198/37 |
| 3,612,248 | 10/1971 | Wallis | 198/37 |

Primary Examiner—Gerald M. Forlenza
Assistant Examiner—Lawrence J. Oresky
Attorney—Michael S. Striker

[57] ABSTRACT

Apparatus for producing, processing and manipulating filter rod sections, wherein the filters contain bundles of filamentary plastic material which is treated with a plasticizer, has a filter rod making machine serving to deliver filter rod sections to a loading unit. The latter forms rows of filter rod sections which are introducted into empty containers for transport to an evacuating station where the contents of filled containers are transferred into the hopper of a transfer unit having several pneumatic conveyors which transport filter rod sections into the magazines of discrete filter cigarette making machines whenever the supply of filter rod sections in the respective magazines decreases below a predetermined value. The period of dwell of filter rod sections in the loading unit, in filled containers, in the hopper of the transfer unit and in the pneumatic conveyors is long enough to insure satisfactory setting of plasticizer prior to severing of filter rod sections and prior to assembly of the resulting filter plugs with sections of wrapped tobacco rods to form filter-tipped smokers' products. The speed of the filter rod making machine decreases or increases in automatic response to an increase or reduction in the number of filled containers, and the speed of the filter cigarette making machines automatically increases or decreases in response to an increase or reduction in the number of filled containers.

6 Claims, 10 Drawing Figures

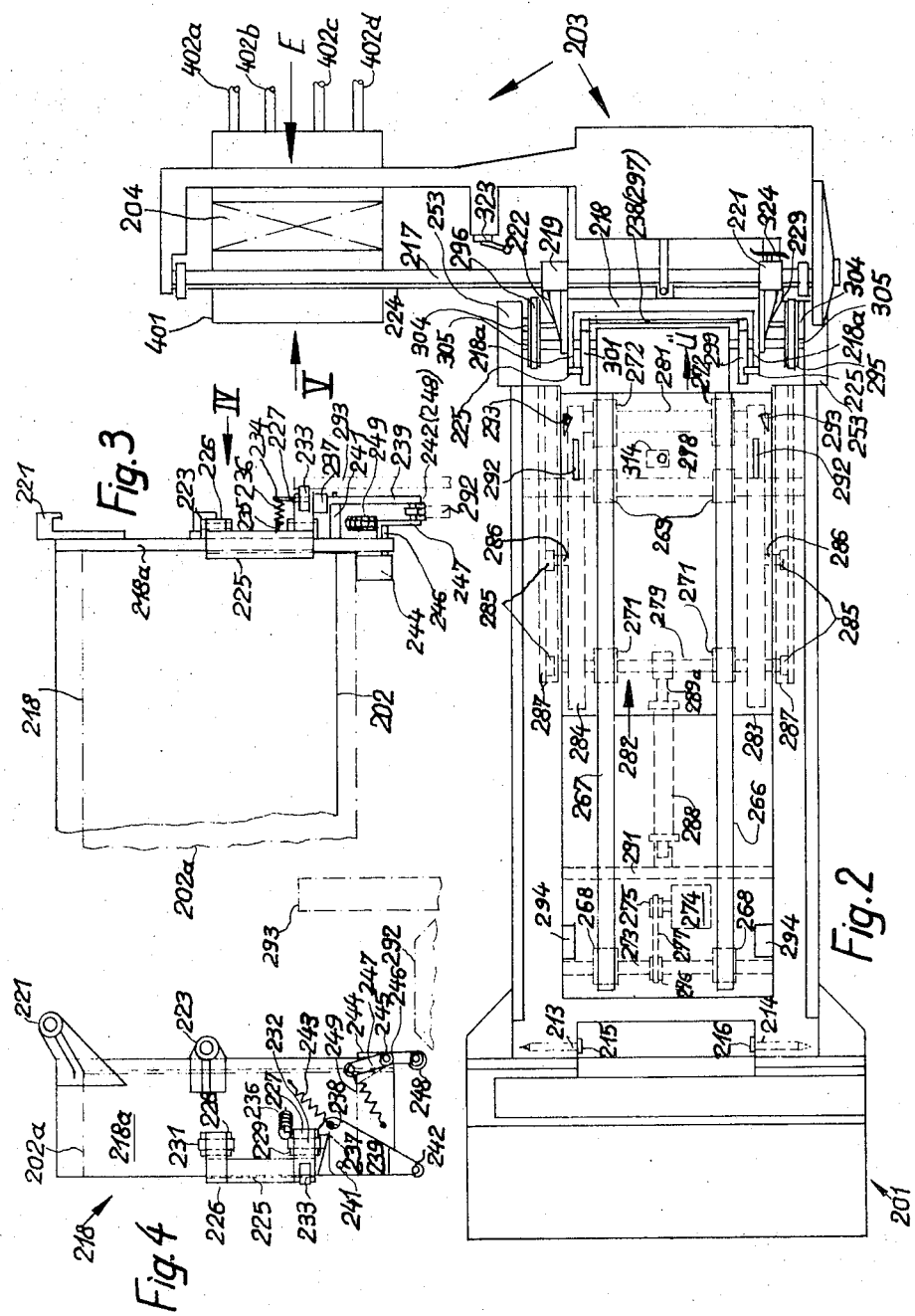

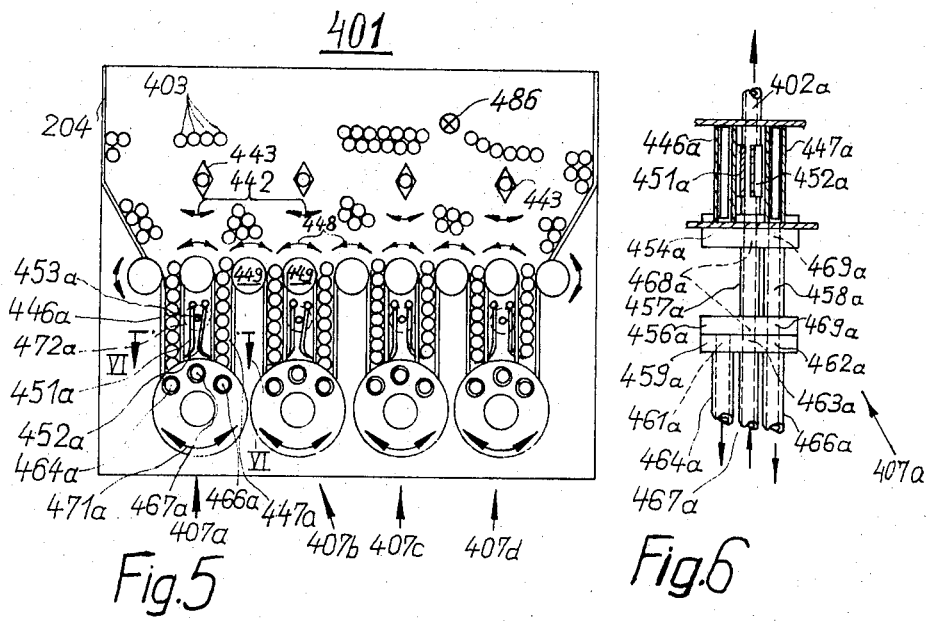
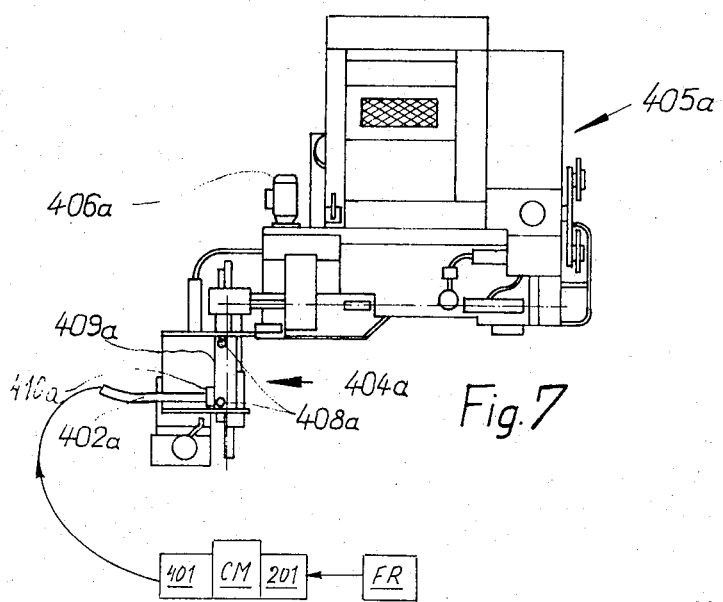

Inventor:
ULRICH BOANFLETH
ATTORNEY

APPARATUS FOR PRODUCING, PROCESSING AND MANIPULATING FILTER ROD SECTIONS

CROSS-REFERENCE TO RELATED APPLICATION

Certain details of the apparatus of the present invention are disclosed in the commonly owned copending application, Ser. No. 878,684 filed by me on Nov. 21, 1969 and entitled "Apparatus for Manipulating Containers for Cigarettes or the Like."

BACKGROUND OF THE INVENTION

The present invention relates to improvements in apparatus for producing, processing and manipulating rod-shaped articles, particularly filter rod sections which can be used for the manufacture of filter cigarettes, filter cigars, filter cigarillos or analogous rod-shaped smokers' products.

Filter rod sections are normally produced in filter rod making machines of the type wherein a tow of filamentary synthetic plastic material (for example, acetate fibers) is treated with a liquid plasticizer which bonds portions of adjoining fibers to each other and wherein the thus treated tow is thereupon wrapped in paper or the like to form a continuous rod which is severed at desired intervals to yield filter rod sections of unit length or multiple unit length. It is customary to sever the continuous filter rod in such a way that each of the resulting sections is of double unit length, four times unit length or six times unit length. Such filter rod sections are thereupon fed to machines which connect them with sections of wrapped tobacco filler rods to form filter-tipped cigarettes, cigars or cigarillos of unit length or multiple unit length.

As a rule, the setting of plasticizer which is used in the manufacture of filter rod sections requires a certain period of time, and it is undesirable to assemble filter rod sections with sections of wrapped tobacco filler rods prior to satisfactory setting of the plasticizer.

SUMMARY OF THE INVENTION

An object of the invention is to provide an apparatus for the production, processing and manipulation of rod-shaped articles, particularly filter rod sections, in such a way that the interval which elapses between the production and manipulation of such articles invariably suffices to insure that the articles are ready for manipulation (such as severing, shuffling, transporting, connecting with other rod-shaped articles and packaging) without affecting their appearance and/or quality.

Another object of the invention is to provide the apparatus with a processing unit which not only insures proper setting or other changes in the condition of one or more ingredients of articles but can also perform other useful functions, particularly as concerns the orientation and temporary storage of articles during transport between the producing and consuming machines.

A further object of the invention is to provide the apparatus with novel means for insuring that each article dwells in the path between the producing and consuming machines for an interval of time which suffices for proper conditioning of its ingredients irrespective of eventual changes in the output of the producing machine or machines and/or in the requirements of the consuming machine or machines.

An additional object of the invention is to provide an apparatus wherein the producing machine for filter rod sections of the type containing fibrous material and a plasticizer which bonds portions of fibers to each other is directly coupled with one or more consuming machines (e.g., with a battery of filter cigarette machines) in such a way that the unit or units which effect the transport of filter rod sections to the consuming machine or machines invariably enable the plasticizer to set before the filter rod sections reach the consuming machines.

Still another object of the invention is to provide the apparatus with a novel and improved control system which insures that the requirements of the consuming machine or machines substantially match the output of the producing machine or machines as well as that the consuming machine or machines need not be arrested in response to short-lasting slowdown or interruptions in the operation of one or more producing machines, and vice versa.

The apparatus of the present invention comprises a source of filter rod sections which may include one or more filter rod making machines, a supply of containers (preferably in the form of so-called chargers or trays), a loading unit connected with the source and including means for filling containers with filter rod sections to thus convert such containers into filled containers, preferably at a rate which varies as a function of changes in the output of the source, conveyor means for transporting filled containers from the loading unit to an evacuating station and for returning evacuated containers to the loading unit, and a processing unit having a magazine or hopper for reception of the contents of filled containers at the evacuating station, at least one pneumatic conveyor, and a transfer device for feeding filter rod sections from the magazine into the pneumatic conveyor which delivers such filter rod sections to a consuming machine, e.g., a filter cigarette making machine. The period of dwell of filter rod sections in the path between the source and the consuming machine or machines is invariably long enough to insure that the filter rod sections are in satisfactory condition for further manipulation, such as severing, shuffling and connection with sections of wrapped tobacco rods to form filter tipped smokers' products.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a plan view of the structure shown in FIG. 1;

FIG. 3 is an enlarged fragmentary front elevational view of a receptacle in the structure of FIGS. 1 and 2;

FIG. 4 is a view as seen in the direction of arrow IV shown in FIG. 3;

FIG. 5 is a front elevational view of the processing unit as seen in the direction of arrow V shown in FIG. 2;

FIG. 6 is a fragmentary horizontal sectional view as seen in the direction of arrows from the line VI—VI of FIG. 5;

FIG. 7 is a diagrammatic plan view of the entire apparatus;

DESCRIPTION OF THE PREFERRED EMBODIMENTS

Figure 1:
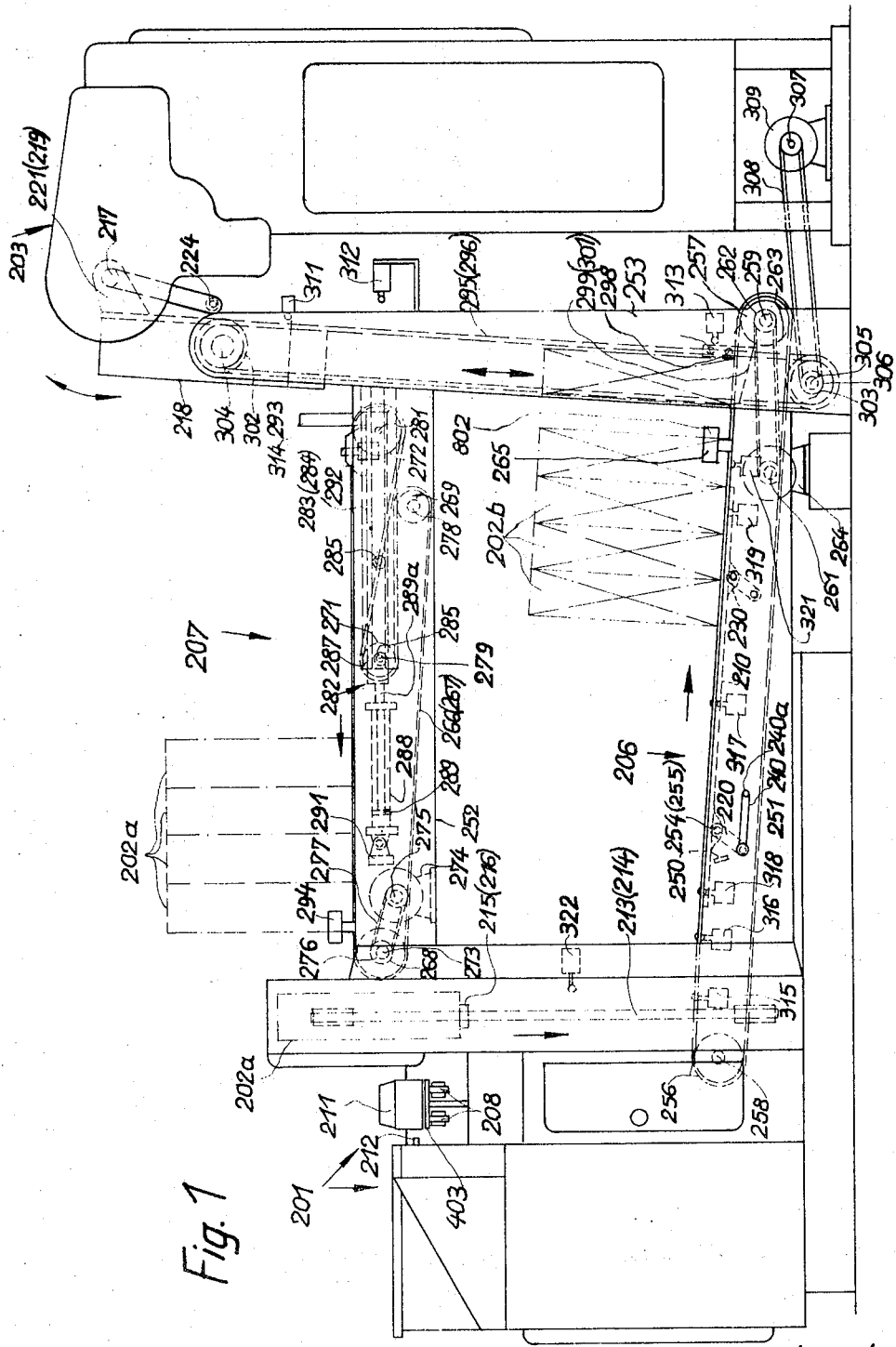
FIG. 1 is a side elevational view of a portion of a first apparatus which serves to fill containers with filter rod sections and to temporarily store filled trays for transfer to a processing unit which distributes filter rod sections by way of pneumatic conveyors to several consuming machines.

Referring first to FIGS. 1 to 4, there is shown a portion of an apparatus which comprises a tray loading or filling unit 201 serving to introduce predetermined numbers of filter rod sections 403 of multiple unit length into successive empty containers in the form of chargers or trays 202a, an evacuating unit 203 for transferring the contents of filled containers in the form of chargers or trays 202b into a hopper or magazine 204 which forms part of a transfer unit or processing unit 401, and two storing units 207, 206 which respectively serve for temporary storage of empty trays 202a and filled trays 202b. The storing unit 206 for filled trays 202b is located at a level below and is spaced from the storing unit 207 for empty trays 202a.

The transfer unit or processing unit 401 comprises elongated pneumatic conveyor conduits 402a, 402b, 402c, 402d which serve to transport filter rod sections 403 from the magazine or hopper 204 into the respective consuming machines of which only the machine 404a,405a is shown in FIG. 7. The consuming machine includes a filter cigarette making machine 404a of the type known as MAX produced by Hauni-Werke Korber & Co. K.G., of Hamburg-Bergedorf, West Germany. The apparatus comprises four consuming machines each having a filter cigarette making machine which receives filter rod sections from one of the four pneumatic conveyor conduits 402a–402d. The illustrated filter cigarette machine 404a has a magazine 409a for filter rod sections 403, and the transfer unit 401 comprises an inserting device 410a which serves to transfer successive filter rod sections 403 from the discharge end of the respective conduit 402a into the lower zone of the magazine 409a. The filter cigarette making machine 404a of the consuming machine shown in FIG. 7 is directly coupled with a cigarette rod making machine 405a of the type known as GARANT produced by Hauni-Werke of Hamburg-Bergedorf, West Germany. A variable-speed motor 406a, preferably a reversible-polarity polyphase electric motor, serves as a common drive means for the machines 404a and 405a of the consuming machine. The manner in which the filter rod sections 403 are manipulated in the machine 404a to form filter cigarettes of unit length or multiple unit length forms no part of the present invention. It suffices to say that each of the filter rod sections 403 may be of six times unit length and that the machine 405a can deliver to the machine 404a pairs of plain cigarettes of unit length. The machine 404a severs each filter rod section 403 at two points to form groups of three filter plugs of double unit length. Such filter plugs are combined with pairs of plain cigarettes of unit length to form filter cigarettes of double unit length each of which can be severed to yield a pair of filter cigarettes of unit length.

Figure 8:
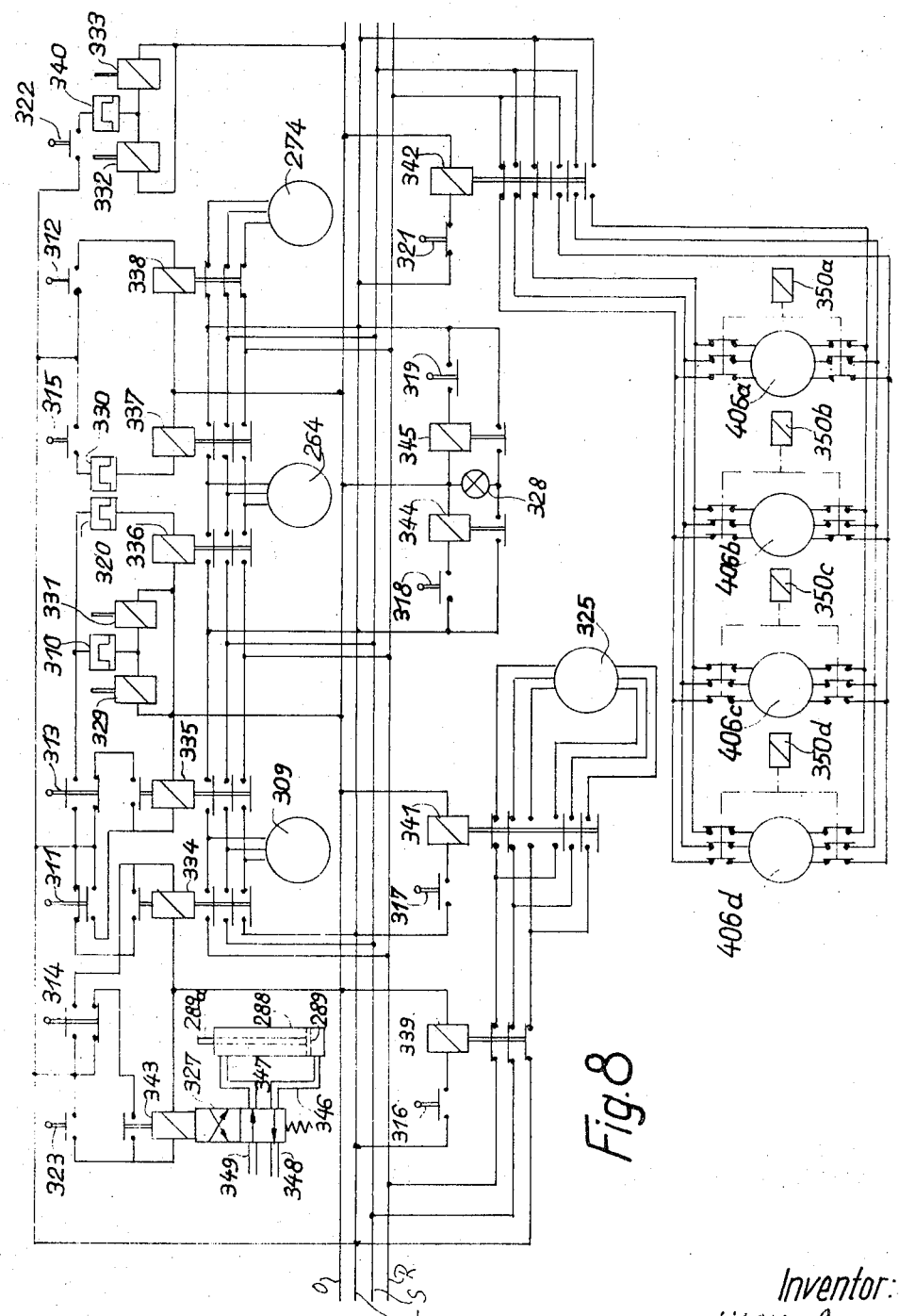
FIG. 8 is a circuit diagram of the control system in the apparatus of FIGS. 1 to 7.

The four consuming machines of the apparatus are represented in FIG. 8 by the four variable-speed drive means 406a, 406b, 406c, 406d.

The tray loading or filling unit 201 is of the type known as CASCADE produced by Hauni-Werke of Hamburg-Bergedorf, West Germany. Reference may be had to U.S. PAT. No. 3,190,459 to Kochalski et al. which describes a loading unit of the type capable of being used in the apparatus of the present invention. FIG. 1 merely shows two parallel endless belts 208 the upper stretches of which transport a layer of filter rod sections 403 sideways into the range of a pneumatic row-forming device or lifter 211. The belts 208 receive filter rod sections 403 of multiple unit length from a conventional filter rod making machine FR (see FIG. 7), for example, from a machine known as KDF and produced by Hauni-Werke, of Hamburg-Bergedorf, West Germany. The underside of the row former 211 is provided with a series of flutes for accumulation of a row of preferably closely adjacent parallel filter rod sections 403 which are thereupon lifted above the belts 208 and moved axially (i.e., in a direction to the right, as viewed in FIG. 1), to be introduced into the adjacent empty trays 202a. Each row contains a predetermined number of parallel filter rod sections 403. The transfer of rows from the flutes of the row former 211 into the adjacent empty tray 202a is effected by a reciprocable transfer member or pusher 212 of the loading unit 201. That tray 202a which receives rows of filter rod sections 403 from the row former 211 is supported by a lowering conveyor having two endless chains 213, 214. These chains are mounted in two parallel vertical planes and are provided with transversely extending rungs or platforms 215, 216 which support the empty tray 202a during stepwise transport past the row former 211 at the loading station. The tray 202a which is in the process of being filled with rows of filter rod sections 403 accumulated by the row former 211 is caused to descend stepwise so as to provide room for introduction of a fresh row of filter rod sections on top of the preceding row. Reference may be had to the aforementioned U.S. PAT. No. 3,190,459 to Kochalski which describes means for synchronizing the movements of an empty tray at the loading station with the movements of the row former and with the movements of the transfer member to insure proper filling of successive trays. A tray 202b which has been filled with rows of filter rod sections 403 during stepwise transport past the loading station is thereupon transferred into the lower storing unit 206 for transport into the range of the evacuating unit 203.

The evacuating unit 203 comprises a horizontal shaft 217 for the bearings 219, 221 of a receptacle 218 which is movable lengthwise and is pivotable about the axis of the shaft 217. The receptacle 218 can transport filled trays 202b from a transfer station U above the discharge end of the lower storing unit 206 to an evacuating station E where the contents of the filled tray 202b are introduced into the hopper or magazine 204 of the transfer unit or processing unit 401, and the receptacle 218 further serves to transport the thus emptied trays 202a to the receiving end of the upper storing unit 207. The drive mechanism which can move the receptacle 218 between the transfer stations U and E forms no part of the present invention and is not shown in its entirety; it comprises bearings 222, 223 and a shaft 224. A suitable drive mechanism for the receptacle 218 is fully disclosed in U.S. PAT. No. 3,527,369 to Bornfleth et al. and in German patent No. 1,291,278.

The receptacle 218 is provided with two holding or confining devices for retention of filled trays 202b in its interior during transport from the transfer station U to the evacuating station E and for retention of empty trays 202a prior to delivery to the upper storing unit 207. Referring in particular to FIGS. 3 and 4, the receptacle 218 has two side walls 218a (one shown) and each of these side walls supports the parts of one of the aforementioned holding or confining devices for trays 202. Each holding device comprises a flap 225 which is secured to two arms 226, 227 pivotable on pintles 231, 232 mounted in brackets 228, 229 on the respective side wall 218a. The arm 227 is provided with a cutout for a rotatably mounted roller follower 233. A helical spring 236 is connected to a first post 234 on the arm 227 and to a second post 235 on the respective side wall 218a; the spring 236 tends to bias the flap 225 to its open or tray-releasing position. Each arm 227 is further provided with a downwardly projecting extension in the form of a locking bolt 237 which can extend into a notch 238 of a lever 239. The lever 239 is rotatable on a pivot pin 241 which is provided on the respective side wall 218a and carries a rotatable roller follower 242. A spring 243 is connected to the lever 239 and to the respective side wall 218a.

The receptacle 218 is further provided with supporting means for trays 202. The supporting means comprises two blocks 244 each of which is adjacent to one of the side walls 218a and each of which is mounted on a bolt 246 which is rotatable in eyelets 245 provided therefor on the receptacle 218. The bolts 246 are fixedly connected with two-armed levers 247. One arm of each lever 247 carries a rotary roller follower 248 and its other arm is connected to a spring 249 which is supported by the respective side wall 218a. The supporting means are designed to be actuated by the trays 202.

The storing units 206, 207 respectively comprise substantially horizontal carriers or bases 251, 252 which are secured to the frame of the loading unit 201 and to an upright frame 253 located in front of the evacuating unit 203. The carrier 251 supports a conveyor which serves to transport filled trays 202b from the loading unit 201 toward the transfer station U. This conveyor comprises two spaced parallel endless belts 254, 255 (FIG. 1) which are trained over idler rollers 256 and driven rollers 257. The filled trays 202b normally rest on the upper stretches of the belts 254 and 255; such upper stretches are preferably slidable along suitable supporting rails, not shown, forming part of or mounted in the respective carrier 251. The idler rollers 256 are rotatable on a horizontal shaft 258 which is fixedly mounted in the frame of the loading unit 201. The driven rollers 257 are fixed to a horizontal shaft 259 which is rotatably journalled in the upright frame 253 and can be rotated by a gear motor 264 by way of a chain transmission including sprocket wheels 261, 262 and an endless chain 263.

Two electromagnetically operable retaining devices or stops 265 of known design are mounted at the discharge end of the storing unit 206 to normally hold the foremost filled tray 202b on the belts 254, 255 against transfer onto a lifting conveyor which serves to move such tray to the transfer station U. The retaining devices 265 are mounted on the lower carrier 251.

The storing unit 206 is further provided with manually operable means for facilitating removal of filled trays 202b from the upper stretches of the belts 254, 255 or the placing of filled trays 202b onto such belts. The placing of filled trays 202b onto the belts 254, 255 might become necessary when the filter rod making machine FR which delivers sections 403 to the belts 208 of the loading unit 201 is idle and the magazine or hopper 204 of the transfer unit 401 should receive filter rod sections for transfer to the respective consuming machine or machines (such as the combination of machines 404a and 405a of FIG. 7). To this end, the carrier 251 supports pairs of links 220, 230 which support a horizontal platform 210 located in the space between the upper stretches of the belts 254, 255. One of the links 220 is fixedly connected with a lever or crank 240 having a handle 240a which can be grasped by hand to move the platform 210 between a raised position in which the platform lifts the filled trays 202b slightly above the upper stretches of the belts 254, 255 and a lowered position in which the upper side of the platform 210 is located at a level slightly below the upper stretches of the belts 254, 255 so that the filled trays 202b rest on such upper stretches. In FIG. 1, the platform 210 is shown in its lower end position, i.e., the filled trays 202b rest on the belts 254, 255. When moved to its upper or raised position, the platform 210 abuts against a suitable stop 250 on the carrier 251. The extent of movement of the platform 210 to a level above or below the plane of the upper sides of upper stretches of the belts 254, 255 need not exceed a small fraction of an inch (e.g., it can be in the range of a few millimeters), as long as the trays 202b can be properly transported by the belts 254, 255 in the lower end position of the platform 210 and are lifted off the belts 254, 255 in the upper or raised position of the platform.

The storing unit 207 for empty trays 202a comprises a conveyor for transport of empty trays from the receptacle 218 at the station U toward the loading unit 201. This conveyor comprises two endless conveyor belts 266, 267 (FIGS. 1 and 2) which are mounted in two spaced parallel vertical planes and are trained over driven rollers 268 (which are rotatable about a fixed horizontal axis), idler rollers 269 (which are rotatable about a fixed horizontal axis) and idler rollers 271, 272 which are rotatable about axes that are movable sideways, i.e., in the longitudinal direction of the carrier 252. The driven rollers 268 are secured to a horizontal shaft 273 which is rotatably journalled in the carrier 252 and is driven by a gear motor 274 through the intermediary of a chain transmission including sprocket wheels 275, 276 and an endless chain 277. The rollers 269 are rotatable on a horizontal shaft 278 which is fixedly mounted in the carrier 252 (see FIG. 2). The rollers 271, 272 are respectively rotatable on shafts 279 and 281. The shafts 279, 281 form part of a reciprocable carriage or dolly 282 and extend between two lateral frame members 283, 284 of this carriage. The latter comprises four wheels 285 two of which are mounted at the ends of the aforementioned shafts 279 and two of which are rotatable on stubs 286 one of which is mounted on the frame member 283 and the other of which is mounted on the frame member 284. The carrier 252 supports or is provided with two parallel guide rails 287 each having a U-shaped profile and each serving to guide two of the wheels 285. These rails are outwardly adjacent to the frame members 283, 284.

The means for moving the carriage 282 back and forth along the guide rails 287 comprises a pneumatic cylinder and piston assembly having a cylinder 288, a piston 289 which is reciprocable in the cylinder 288, and a piston rod 289a which is connected with the piston 289 and with the shaft 279 of the carriage 282. The cylinder 288 is connected to a traverse or crosshead 291 of the carrier 252.

Each of the two frame members 283, 284 supports a cam 292 for the respective roller followers 242, 248 and a ruler or cam 293 for the respective roller follower 233.

The storing unit 207 further comprises a pair of electromagnetically operable retaining devices or stops 294 which are analogous to the retaining devices 265 and are adjacent to the left-hand end of the carrier 252 to temporarily hold the foremost empty tray 202a against entry into the tray loading or filling unit 201.

The upright frame 253 supports the aforementioned lifting conveyor which serves to move the foremost filled tray 202b from the storing unit 206 into the receptacle 218 at the transfer station U. This lifting conveyor comprises two endless chains 295, 296 which are mounted in two parallel vertical planes and are connected to each other by horizontal rungs 297, 298. The rungs 297, 298 are fixedly connected with supporting members 299, 301 which form a lifting platform for filled trays 202b. Each of the chains 295, 296 is trained over a pair of sprocket wheels 302, 303. The sprocket wheels 302 are rotatable on stubs 304 which are fixedly secured to the frame 253. The sprocket wheels 303 are fixed to a horizontal shaft 305 which is rotatably mounted in the frame 253 and can be rotated by a drive comprising a gear motor 309 and a chain transmission including two sprocket wheels 306, 307 and an endless chain 308.

The various drives and assemblies of the heretofore described parts of the apparatus are started, arrested and/or otherwise controlled by a system of a signal generating detectors which are shown in FIGS. 1, 2 and 8. These detectors also serve to control the variable-speed drive means 325 of the filter rod making machine FR which delivers filter rod sections 403 to the belts 208 of the loading unit 201 and the four consuming machines of which only one (namely, the combination of the filter cigarette making machine 404a and cigarette rod making machine 405a) is shown in FIG. 7. The detectors include a first detector 311 which is mounted on or adjacent to the upright frame 253 and controls the operation of the gear motor 309 of the drive for the chains 295, 296. A second detector 312 is mounted on or adjacent to the frame 253 at a level below the detector 311 (see FIG. 1) and serves to control the operation of the gear motor 274 for the belts 266, 267. A third detector 313 is mounted on or adjacent to the frame 253 at the right-hand end of the storing unit 206 (as viewed in FIG. 1) and serves to control the operation of the gear motors 264, 309 and of the two retaining devices or stops 265 in the storing unit 206. A fourth detector 314 is mounted at the receiving end of the upper storing unit 207 and serves to control the operation of the gear motor 309 and of the cylinder and piston assembly 288, 289 which reciprocates the carriage 282 along the guide rails 287. A fifth detector 315 is located at the receiving end of the lower storing unit 206 and serves to control the operation of the gear motor 264. Two detectors 316, 317 are mounted on the lower carrier 251 and serve to control the operation of the drive means or motor 325 of the filter rod making machine FR which delivers filter rod sections 403 to the belts 208. Two detectors 318, 319 on the carrier 251 control a signal generating device which may include a lamp 328 (see FIG. 8). The variable-speed drive means or motors 406a, 406b, 406c, 406d for the four consuming machines (see also the motor 406a for the machines 404a and 405a shown in FIG. 7) are shown in FIG. 8 and are controlled by a detector 321 which is mounted on the carrier 251 adjacent to the frame 253. Another detector 322 is adjacent to the loading station and serves to control the operation of retaining devices or stops 294 in the storing unit 207. A detector 323 (see FIG. 2) is mounted in the evacuating unit 203 and controls the operation of the cylinder and piston assembly 288, 289 of the drive for the carriage 282. The detector 323 can be actuated by a ruler or cam 324 which is mounted on the bearing 221 of the receptacle 218.

The details of the transfer unit or processing unit 401 are illustrated in FIGS. 5 and 6. This unit comprises the aforementioned magazine or hopper 204, the aforementioned pneumatic conveyor conduits 402a, 402b, 402c, 402d for the respective consuming machines, and four transfer devices 407a, 407b, 407c, 407d which respectively serve to feed filter rod sections 403 from the magazine or hopper 204 into the corresponding conduits 402a–402d. FIGS. 5 and 6 merely show the details of the transfer device 407a which delivers filter rod sections 403 from the hopper 204 into the conduit 402a because the transfer devices 407b–407d are preferably identical with and their mode of operation is also identical with that of the transfer device 407a.

The interior of the hopper 204 contains a battery of agitators 443 which are oscillated back and forth in directions indicated by double-headed arrows 442 and serve to equalize the supply of filter rod sections 403 in the hopper.

The transfer device 407a comprises two vertical ducts 446a, 447a the upper or receiving ends of which are flanked by rollers 449 which are oscillated in directions indicated by double-headed arrows 448. The rollers 449 prevent blocking of the inlets to the ducts 446a, 447a. The space between the ducts 446a, 447a accommodates two blocking pawls 451a, 452a which have pallets or teeth provided at their lower ends and movable into the respective ducts 446a, 447a to prevent the lowermost filter rod sections 403 in these ducts from descending into the lowermost zones of such ducts for evacuation into the associated conduit 402a. The blocking pawls 451a, 452a can be pivoted apart, so as to introduce their pallets into the respective ducts 446a, 447a, by the pin-shaped armature 453a of an electromagnet 472a. When the armature 453a is moved into the space between the blocking pawls 451a, 452a, the pallets are held in operative positions and prevent evacuation of sections 403 from the ducts 446a, 447a.

The transfer device 407a further comprises a reel-shaped assembly which includes two disk-shaped flanges 454a, 456a connected to each other by two parallel horizontal tubes 457a, 458a. The tube 457a registers with the lowermost part of the duct 446a when the tube 458a registers with the inlet of the conduit 402a and the tube 458a registers with the lowermost part of the duct 447a when the tube 457a registers with the inlet of the conduit 402a. The flange 456a is adjacent to and is oscillatable in directions indicated by the double-headed arrow 471a relative to a stationary flange 459a which is provided with bores 461a, 462a, 463a. The bores 461a, 462a respectively communicate with the inlets of suction pipes 464a, 466a and the bore 463a is in communication with the discharge end of a supply pipe 467a for compressed air. Each of the flanges 454a, 456a is provided with bores 468a, 469a which respectively communicate with the ends of the tubes 457a, 458a. The mechanism for oscillating the flanges 454a, 456a in directions indicated by the arrow 471a is not shown in the drawing; such mechanism causes the bores 468a, 469a to respectively communicate with the duct 446a and conduit 402a in one end position of these flanges and with the conduit 402a and duct 447a in the other end position of such flanges. The bores 468a, 469a of the flange 456a alternately register with the bores 461a, 463a or 463a, 462a of the stationary flange 459a.

A photosensitive detector 486 in the magazine or hopper 204 of the processing unit or transfer unit 401 serves to produce signals which control the operation of the evacuating unit 203, i.e., the hopper 204 receives the contents of a filled tray 202b when the detector 486 produces a signal indicating that the supply of filter rod sections 403 in the hopper 204 has descended below a predetermined level.

The electromagnet 472a whose armature 453a actuates the blocking pawls 451a, 452a is energizable by a detector 408a which is installed in the magazine 409a of the filter cigarette making machine 404a. The arrangement is such that the detector 408a causes the armature 453a to penetrate into the space between the blocking pawls 451a, 452a when the magazine 409a is filled with filter rod sections 403 to a predetermined maximum level whereby the pallets of the pawls 451a, 452a prevent the filter rod sections 403 in the ducts 446a, 447a from descending into registry with the bores 468a, 469a of the continuously oscillating flange 454a. The detector 408a is preferably of the type which includes a lower level indicator and an upper level indicator. The upper level indicator causes the electromagnet 472a to terminate the transfer of filter rod sections 403 into the magazine 409a when the latter accommodates a maximum permissible number of sections, and the lower level indicator causes the electromagnet 472a to withdraw the armature 453a from the space between the blocking pawls 451a, 452a and to thus permit withdrawal of pallets from the ducts 446a, 447a and the transport of filter rod sections 403 through the conduit 402a and into the magazine 409a. The level indicators of the detector 408a may comprise light sources and photosensitive elements whereby the photosensitive element of the upper level indicator produces a signal when the filter rod sections 403 in the magazine 409 interrupt the respective light beam and the photosensitive element of the lower level indicator produces a signal when the filter rod sections 403 permit the respective light beam to reach its photosensitive surface.

The circuit diagram of FIG. 8 illustrates the control system of the apparatus of FIGS. 1 to 7. This Figure shows the aforementioned gear motors 264, 274, 309, the motor 325 which drives the filter rod making machine FR which supplies filter rod sections 403 to the belts 208 of the tray loading or filling unit 201, the motor 406a which drives the consuming machine 404a, 405a, the motors 406b, 406c, 406d which drive the other three consuming machines, an electromagnetic valve 327 which controls the flow of fluid into and from the chambers of the cylinder 288, the aforementioned signal lamp 328, the electromagnets 329 and 331 for the retaining devices or stops 265, a trigger 310 for the electromagnets 332, 333, the electromagnets 332, 333 for the retaining devices or stops 294 and the associated trigger 340, relays 336, 337 with associated triggers 320, 330 and relays 334, 335, 338, 339, 341, 342, 343, 344, 345. The relays 339, 341, 344 and 345 are time-delay relays. The diagram of FIG. 8 further shows the aforementioned signal generating detectors 311–319, 321–323 each of which is shown in the form of an electric switch.

The source of polyphase current for the electric motors, electromagnets and relays of the control system includes leads R, S, T and zero lead O. The electromagnetic valve 327 is connected with the chambers of the cylinder 288 by pipes 345, 347. The valve 327 is further connected with a suitable blower (not shown) by pipes 348 and 349. Such blower can constitute or forms part of the means which generates suction in the row former 211 of the tray loading or filling unit 201 and which is further connected with the suction pipes and supply pipes of the transfer devices 407a, 407b, 407c, 407d.

The relays 339, 341 regulate the speed of the motor 325 for the filter rod making machine FR and the relay 342 regulates the speed of the motors 406a–406d for the four composite consuming machines.

The storing units 206, 207, the lifting conveyor 295, 296 and the receptacle 218 of the evacuating unit 203 together constitute a conveyor system CM (see FIG. 7) which transports filled containers 202b to the evacuating station E and returns empty containers 202a to the loading unit 201, i.e., to the conveyor 213, 214 of the loading unit. The conveyor system CM and the loading unit 201 establish a direct connection between the producing machine FR and the four consuming machines, i.e., there are no interruptions in the path along which the filter rod sections 403 are transported between the machine FR and the magazines 409 of the filter cigarette making machines 404.

The operation:

It is assumed that the tray loading unit 201 is in operation and that the storing units 206, 207 respectively contain supplies of filled trays 202b and empty trays 202a (see FIG. 1). The empty or partially filled tray 202a which is supported by the platforms 215, 216 of the chains 213, 214 descends in stepwise fashion to receive successive rows of filter rod sections 403 which are transferred into such tray by the pusher 212 whereby the pusher shifts the filter rod sections axially to expel them from the flutes at the underside of the row former 211. The belts 208 of the loading unit 201 receive a single file of filter rod sections 403 from the filter rod making machine FR which is driven by the variable-speed motor 325 shown in FIG. 8.

When the tray 202a on the platforms 215, 216 descends with the left-hand stretches of the chains 213, 214 to a predetermined level, it actuates the detector 322 for the trigger 340 which energizes the electromagnets 332, 333 for the retaining devices or stops 294 on the upper carrier 252. This takes place shortly before the tray on the platforms 215, 216 is filled with filter rod sections 403. Thus, the retaining devices 294 release the foremost (leftmost) empty tray 202a on the upper stretches of the belts 266, 267 for introduction into the loading unit 201 when the tray 202a which descends with the chains 213, 214 is filled or nearly filled so that the thus introduced empty tray 202a can receive a freshly formed row of filter rod sections 403 immediately after the preceding row has been transferred into the preceding tray 202a (which is thus converted into a filled tray 202b). The freshly filled tray 202b descends onto the upper stretches of the belts 254, 255 in the lower storing unit 206 and is to be moved off the respective platforms 215, 216. This filled tray 202b actuates the detector 315 which transmits a signal to the trigger 330. The latter energizes the relay 337 which completes the circuit of the gear motor 264 for a period of time which is determined by the setting of the trigger 330 and suffices to enable the motor 264 to transport (if necessary) a filled tray 202b from the position above the detector 315 all the way to the retaining devices or stops 265. Such extensive movement of a filled tray 202b takes place if the storing unit 206 is empty so that the belts 254, 255 must transport the freshly filled tray 202b from the chains 213, 214 and all the way to the retaining devices or stops 265.

When the supply of filter rod sections 403 in the magazine 409 of one of the four filter cigarette making machines 404 sinks below the minimum permissible level, the respective transfer device 407a, 407b, 407c or 407d receives a signal which causes the actuated transfer device to start the feed of filter rod sections 403 into the respective pneumatic conveyor conduit 402a, 402b, 402c or 402d. Such signal is generated by the respective detector 408 and more particularly by the lower level indicator of the respective detector 408. The mode of operation of one of the transfer devices 407a–407d will be described with reference to the transfer device 407a of FIGS. 5 and 6 which serves to feed filter rod sections 403 from the hopper 204 of the transfer unit or processing unit 401 into the conduit 402a for pneumatic transport into the magazine 409a of the filter cigarette making machine 404a.

When the supply of filter rod sections 403 in the magazine 409a sinks below the lower level indicator of the detector 408a, the latter energizes or deenergizes the electromagnet 472a so that the armature 453a is withdrawn from the space between the blocking pawls 451a, 452a, i.e., the pallets of these pawls are withdrawn from the ducts 446a, 447a of the transfer device 407a. The detector 408a responds only to longer-lasting actuation of the lower level indicator; short-lasting fluctuations in the position of the upper level of the supply of filter rod sections 403 in the magazine 409a of the machine 404a are unable to change the condition of the electromagnet 472a because the connection between this electromagnet and the level indicators of the detector 408a preferably contains suitable time-delay devices, not shown.

As soon as the pallets of the blocking pawls 451a, 452a are withdrawn from the respective ducts 446a, 447a, the filter rod sections 403 in these ducts can descend into registry with the bores 468a, 469a of the continuously oscillating flange 454a. Thus, the lowermost filter rod section 403 in the duct 446a can register with the bore 468a of the flange 454a in one end position of this flange and the lowermost filter rod section 403 in the duct 447a registers with the bore 469a of the flange 454a in the other end position of this flange. The suction pipe 466a withdraws the lowermost section 403 from the duct 447a when the flanges 454a, 456a assume the end positions shown in FIG. 6; the thus withdrawn section 403 is then located in the tube 458a and the section 403 which was previously transferred from the lowermost part of the duct 446a into the tube 457a then registers with the supply pipe 467a and with the conduit 402a so that it can be propelled into the inserting device 410a for introduction into the magazine 409a of the machine 404a.

The flanges 454a, 456a are thereupon moved to the other end position so that the tube 458a (which contains a freshly introduced filter rod section 403) registers with the conduit 402a and with the supply pipe 467a and can be propelled through the conduit 402a, into the inserting device 410a, and thence into the magazine 409a. At the same time, the tube 457a registers with the suction pipe 464a and with the lowermost part of the duct 446a so that the lowermost filter rod section 403 of the column of sections in the duct 446a is transferred into the tube 457a and can be introduced into the conduit 402a as soon as the flanges 454a, 456a return to the end position shown in FIG. 6. The same procedure is repeated again and again so that the transfer device 407a enables the conduit 402a to deliver to the inserting unit 401a a succession of filter rod sections 403 which are withdrawn alternatively from the lowermost parts of the ducts 446a, 447a. Each filter rod section 403 first enters the tube 457a (duct 446a) or 458a (duct 447a) and is thereupon moved into registry with the conduit 402a and with the supply pipe 467a for pneumatic transport into the inserting device 401a. The introduction of filter rod sections 403 into the magazine 409a is terminated when the upper level indicator of the detector 408a determines that the supply of filter rod sections has risen to the maximum permissible level. The electromagnet 472a is then deenergized or energized to introduce the armature 453a into the space between the blocking pawls 451a, 452a and to thus prevent the filter rod sections 403 in the ducts 446a, 447a from descending into registry with the bores 468a, 469a of the flange 454a.

The detectors 408 of the four filter cigarette making machines 404 transmit signals to the respective transfer devices 407a–407d independently of each other, depending only on the quantity of filter rod sections 403 in the respective magazines 409. If the supply of filter rod sections 403 in the magazine or hopper 204 of the transfer unit or processing unit 401 decreases to such an extent that the detector 486 produces a signal, the receptacle 218 (which contains a filled tray 202b and is located at the evacuating station E in a position of readiness next to the hopper 204) is caused to transfer the contents of the filled tray therein into the hopper. Such transfer of the contents of a filled tray 202b into the hopper 204 can take place in a manner as disclosed in U.S. Pat. No. 3,527,369 to Bornfleth et al. The evacuation of the contents of such filled tray takes place at the evacuating station E in response to sidewise and pivotal movement of the receptacle 218, and the receptacle is thereupon moved away from the hopper 204 to be ready for delivery of the empty tray to the storing unit 207. Such delivery takes place after the receptacle 218 completes its movement along the shaft 217 from the evacuating station E to the transfer station U. As the receptacle 218 moves with reference to the shaft 217, its cam 324 (which is shown as being mounted on the bearing 221, see FIG. 2) actuates the detector 323 which energizes the relay 343 (see FIG. 8) so that the latter changes the position of the spool in the valve 327. The pipe 346 is then connected with the source of compressed air so that the piston 289 is caused to move in a direction to the right, as viewed in FIG. 1, whereby the piston rod 289a pushes the carriage 282 toward a receiving position adjacent to the upright frame 253. When the carriage 282 reaches such receiving position, it actuates the detector 312 which energizes the relay 338 (FIG. 8) so that the latter arrests the motor 274 which in turn arrests the belts 266, 267 of the storing unit 207. At such time, the receptacle 218 (with the fresly evacuated tray therein) has reached the transfer station U and has been pivoted from an inclined position which it assumes during transport along the shaft 217 to an upright position above the carriage 282 which dwells in the receiving position. As the receptacle 218 pivots from the inclined to the upright position (at the station U), the cams 292 on the frame members 283, 284 of the carriage 282 are engaged by the roller followers 248 which pivot the respective supporting blocks 244 against the opposition of the springs 249 so that the blocks 244 assume their retracted or inoperative positions and the empty tray 202a descends by gravity onto the upper stretches of the belts 266, 267 to thereby actuate the detector 314. The detector 314 opens the holding circuit of the relay 343 (FIG. 8) whereby the spool of the valve 327 changes its position under the action of a spring in the valve 327 so that the pipe 347 is connected with the source of compressed air and the piston 289 is retracted to the position shown in FIGS. 1 and 8. Thus, the carriage 282 is retracted in a direction toward the loading unit 201. The carriage 282 is disengaged from the detector 312 as soon as it starts to leave the receiving position whereby the detector 312 deenergizes the relay 338 which completes the circuit of the motor 274. Thus, the belts 266, 267 in the storing unit 207 are set in motion. The cams 292 on the frame members 283, 284 of the carriage 282 engage the roller follwers 242 of the holding or confining means on the receptacle 218 as soon as the carriage 282 starts to leave the receiving position whereby the roller followers 242 pivot the respective levers 239 against the opposition of the associated springs 243. The bolts 237 are withdrawn from the notches 238 and the springs 236 cause the arms 226, 227 to pivot the flaps 225 about the axes of the respective pintles 231, 232 so that the flaps 225 move to their open positions and permit removal of the empty tray 202a from the interior of the receptacle 218. The travelling belts 266, 267 transport the empty tray 202a past the open flaps 225 and toward the loading unit 201 until the tray comes into abutment with the preceding empty tray 202a in the storing unit 207. While the carriage 282 moves toward the loading unit 201, the cams 292 move with reference to and beyond the roller followers 242, 248 so that the springs 249 are free to pivot the levers 247 in order to return the supporting blocks 244 to their operative positions and the springs 243 are free to pivot the levers 239 to their operative positions. The cams 293 which move with the cams 292 engage the roller followers 233 to return the flaps 225 to their operative or confining positions whereby the levers 239 reengage the notches 238. Upon completion of the just described operations, the drive for the receptacle 218 pivots the latter from the upright position to the inclined position in which the receptacle 218 is ready to accept a filled tray 202b.

When the detector 314 causes the cylinder and piston assembly 288–289 to move the carriage 282 toward the loading unti 201, it also causes the relay 334 to start the motor 309 which drives the sprocket wheels 303 by way of the chain transmission 306–308 in such direction that the left-hand stretches of the chains 295, 296 (as viewed in FIG. 1) travel upwardly and the supporting members 299, 301 move a filled tray 202b into the receptacle 218 which is held at the transfer station U in suitably inclined position to receive the oncoming filled tray 202b. This tray pushes the supporting blocks 244 aside during entry into the receptacle 218 whereupon the blocks 244 reassume their operative positions under the action of the springs 249 and are ready to support the tray 202b from below. Immediately thereafter, the supporting member 299 (which continues to move upwardly with the member 301) actuates the detector 311 which opens the holding circuit of the relay 334 and completes the circuit of the relay 335. This changes the direction of rotation of the motor 309 so that the left-hand stretches of the chains 295, 296 start to move downwardly, as viewed in FIG. 1, to return the supporting members 299, 301 to their starting positions in which the members 299, 301 are ready for reception of a filled tray 202b from the storing unit 206. During such downward movement of the supporting members 299, 301, the filled tray 202b which has been lifted above and beyond the supporting blocks 244 is caused to descend onto these blocks while the members 299, 301 continue to move toward their starting positions. The receptacle 218, with the filled tray 202b securely confined and supported therein, is thereupon automatically advanced to the position of readiness at the evacuating station E so as to be capable of immediately transferring the contents of the filled tray into the hopper 204 in response to a signal from the detector 486.

As the motor 309 moves the supporting members 299, 301 back to their starting positions, the member 299 actuates the detector 313 which opens the holding circuit of the relay 335 whereby the latter arrests the motor 309 so that the chains 295, 296 are arrested in the starting positions of the supporting members 299, 301. At the same time, the detector 313 transmits a signal to the trigger 310 which energizes the electromagnets 329, 331 for the retaining devices or stops 265 in the storing unit 206. The detector 313 further transmits a signal to the trigger 320 which energizes the relay 336 to start the motor 264 for the belts 254, 255 of the storing unit 206. These belts advance the filled trays 202b in a direction toward the frame 253 so that the foremost filled tray is transferred onto the supporting members 299, 301 of the chains 295, 296. The triggers 310, 320 are adjusted in such a way that the retaining members 265 release only one filled tray 202b at a time. This completes a working cycle, and the next cycle is started in response to transmission of a signal from the detector 486 in the hopper 204, i.e., when the transfer unit or processing unit 401 is in need of a fresh supply of filter rod sections 403 for delivery to one or more consuming machines.

That portion of the control system which automatically regulates the speed of the motor 325 for the filter rod making machine FR which produces filter rod sections 403 for delivery to the belts 208 of the loading unit 201, and the speed of the motors 406a–406b for the consuming machines which receive filter rod sections 403 from the hopper 204 of the unit 401 functions as follows:

The operating speed of the loading unit 201 is synchronized with the speed of the filter rod making machine FR and with the speeds of the filter cigarette making machines 404 each of which is directly coupled with a cigarette rod making machine 405 (see the machines 404a and 405a of FIG. 7) in such a way that the filter rod making machine FR normally produces filter rod sections 403 at a rate slightly exceeding the normal requirements of the consuming machines. The arrangement is such that the number of filled trays 202b in the storing unit 206 fluctuates within a certain range, namely, that the belts 254, 255 in the storing unit 206 support a certain number of filled trays which can slightly exceed or is slightly less than a predetermined average number (e.g., five).

If one or more consuming machines are arrested for whatever reason, for example, due to malfunctioning or for the purposes of inspection, the filter rod making machine FR at first continues to turn out filter rod sections 403 at a normal rate so that the number of filled trays 202b in the storing unit 206 rises. The operating speed of the motor 325 for the filter rod making machine FR is snychronized with the operating speed of the loading unit 201 so that the latter processes the entire output of the filter rod making machine and the number of filled trays 202b in the storing unit 206 rises since the receptacle 218 is called upon to transfer the contents of filled trays 202b into the hopper 204 of the unit 401 at less frequent intervals. When the number of filled trays 202b in the storing unit 206 rises to such an extent that the leftmost filled tray (as viewed in FIG. 1) continues to rest on and actuates the detector 317 for an interval of time which is determined by the adjustment of the time-delay relay 341, the latter becomes energized and changes the speed of the motor 325 so that the filter rod making machine FR is operated at a reduced speed and turns out fewer filter rod sections 403 per unit of time. The operating speed of the loading unit 201 is reduced accordingly so that the unit 201 fills fewer trays 202a per unit of time. For example, the time-delay relay 341 can reduce the output of the filter rod making machine FR to one-half of its normal output.

If one or more consuming machines continue to remain idle so that the number of filled trays 202b in the storing unit 206 continues to rise even though the motor 325 drives the filter rod making machine FR at less than normal speed, the leftmost filled tray 202b on the belts 254, 255 comes to rest on and actuates the detector 318 which causes the relay 344 to complete the circuit of the signal lamp 328 with a predetermined delay. If the person or persons in charge fail to notice the lighting of the lamp 328 and do not remove one or more filled trays 202b from the storing unit 206 or do not arrest the filter rod making machine FR (and hence the loading unit 201), the number of filled trays 202b in the storing unit 206 continues to rise and the leftmost filled tray 202b comes to rest on and actuates the detector 316 for an interval of time which is long enough to cause the time-delay relay 339 to become energized and to open the circuit of the motor 325 so that the filter rod making machine FR is arrested together with the loading unit 201.

If the motor 325 of the filter rod making machine FR is arrested (e.g., due to malfunctioning or for the purposes of inspection) while the consuming machines continue to operate normally, the number of filled trays 202b in the storing unit 206 begins to decrease. When the number of trays 202b decreases to such an extent that the detector 319 in the storing unit 206 is not engaged by a filled tray, the detector 319 energizes the relay 345 with a predetermined delay and the latter completes the circuit of the signal lamp 328. If the filter rod making machine FR continues to remain idle (this is a rare occurrence) and the person or persons in charge fail to notice the signal furnished by the lamp 328 and fail to introduce filled trays 202b into the storing unit 206 (e.g., by withdrawing such filled trays from an auxiliary magazine or from the storing unit 206 for another group of producing and consuming machines), or if the person or persons in charge fail to arrest one or more consuming machines, the retaining devices 265 ultimately release the last filled tray 202b for transfer onto the supporting members 299, 301 of the chains 295, 296. The detector 321 is then caused to produce a signal which is used to energize the relay 342 so that the latter reduces the operating speed of the motors 406a–406d of the four consuming machines. The consuming machines then turn out filter cigarettes at a reduced rate and consume the supplies of filter rod sections 403 in the hopper 204 as well as in their own magazines 409. This insures that the consuming machines need not be brought to a full stop in response to relatively short-lasting interruptions in operation of the filter rod making machine FR. FIG. 8 further shows monitoring devices 350a, 350b, 350c, 350d which are mounted in or on the magazines 409 of the respective machines 404 and automatically arrest the corresponding machines 404 when the supply of filter rod sections 403 in the corresponding magazines 409 is exhausted or is depleted to a preselected minimum quantity. Prior to renewed starting of the machines 404, the storing unit 206 must receive (preferably) several filled trays 202b from an auxiliary magazine (not shown) in order to insure that the number of filled trays 202b in the storing unit 206 will again fluctuate within a desired range when the machines 204 are in operation simultaneously with the filter rod making machine FR. The manner in which filled trays 202b can be readily inserted into or removed from the storing unit 206 by appropriate manipulation of the platform 210 has been described in connection with FIGS. 1 to 4.

The just described control elements for automatically regulating the operation of the producing (filter rod making) machine FR and of the machines 404 are preferably but not necessarily mounted in or near the storing unit 206. It is equally within the purview of the invention to install such control elements in or at the storing unit 207 for empty trays 202a so that the operating speed of the producing and consuming machines can be regulated as a function of the number of available empty trays on the belts 266, 267. It is further possible to employ control elements which respond to fluctuations in the number of filled and/or empty trays, i.e., some control elements may be installed in the storing unit 206 and the remaining control elements can be installed in the storing unit 207. The aforedescribed detectors 316, 317, 318, 319, 321 constitute but one type of control elements which can be used in the improved apparatus to regulate the operation of producing and consuming machines (and of the loading unit 201) in dependency on the number of available filled and/or empty trays. It is clear that the number of control elements in the storing unit 206 and/or 207 can be increased so that the motor 325 of the producing machine FR and/or the motors 406a–406d of the consuming machines can be operated at three or more different speeds in dependency on changes in the number of available filled and/or empty trays.

Figure 9:
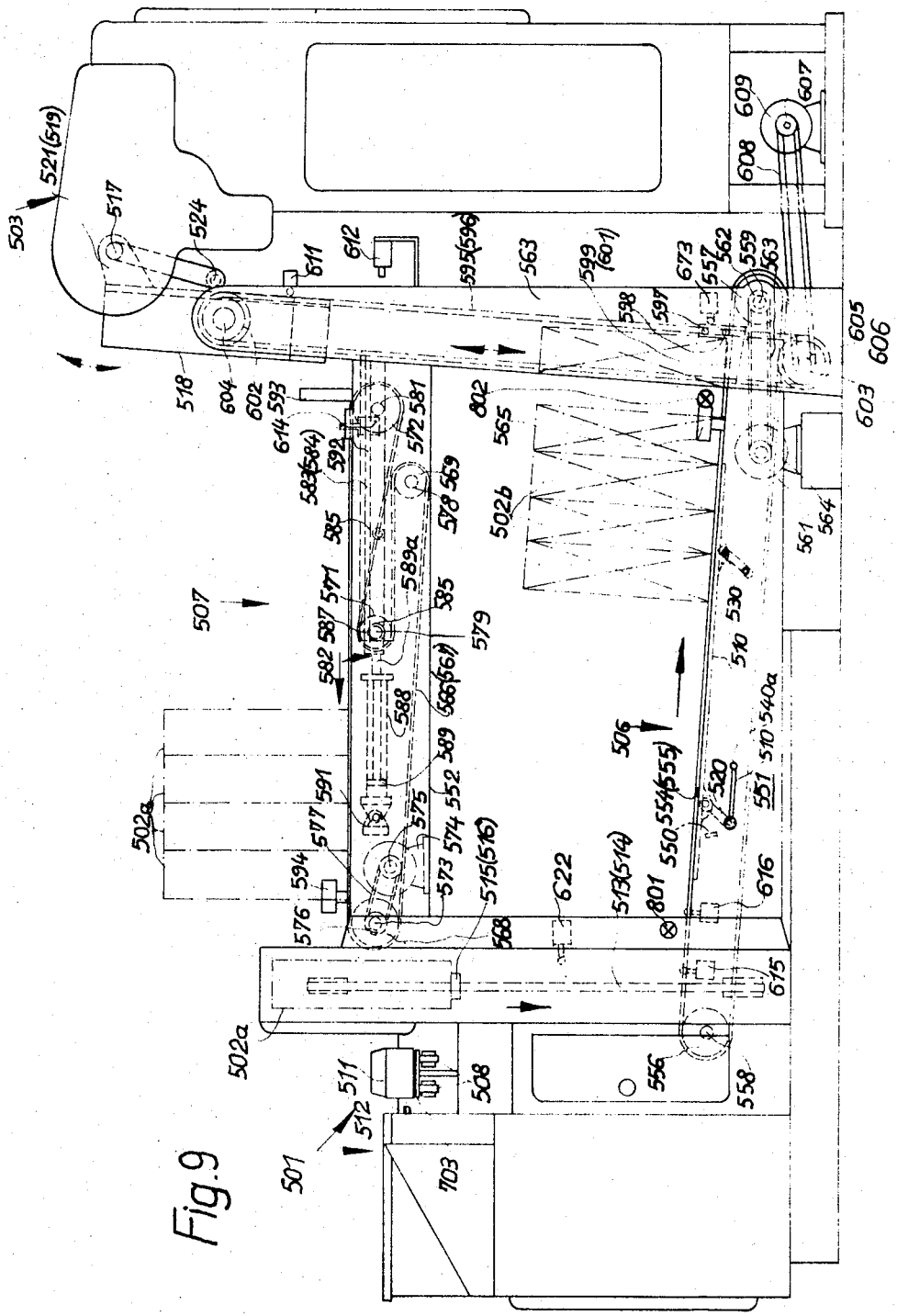
FIG. 9 is a side elevational view of a portion of a second apparatus which constitutes a modification of the apparatus of FIGS. 1 to 8.
Figure 10:
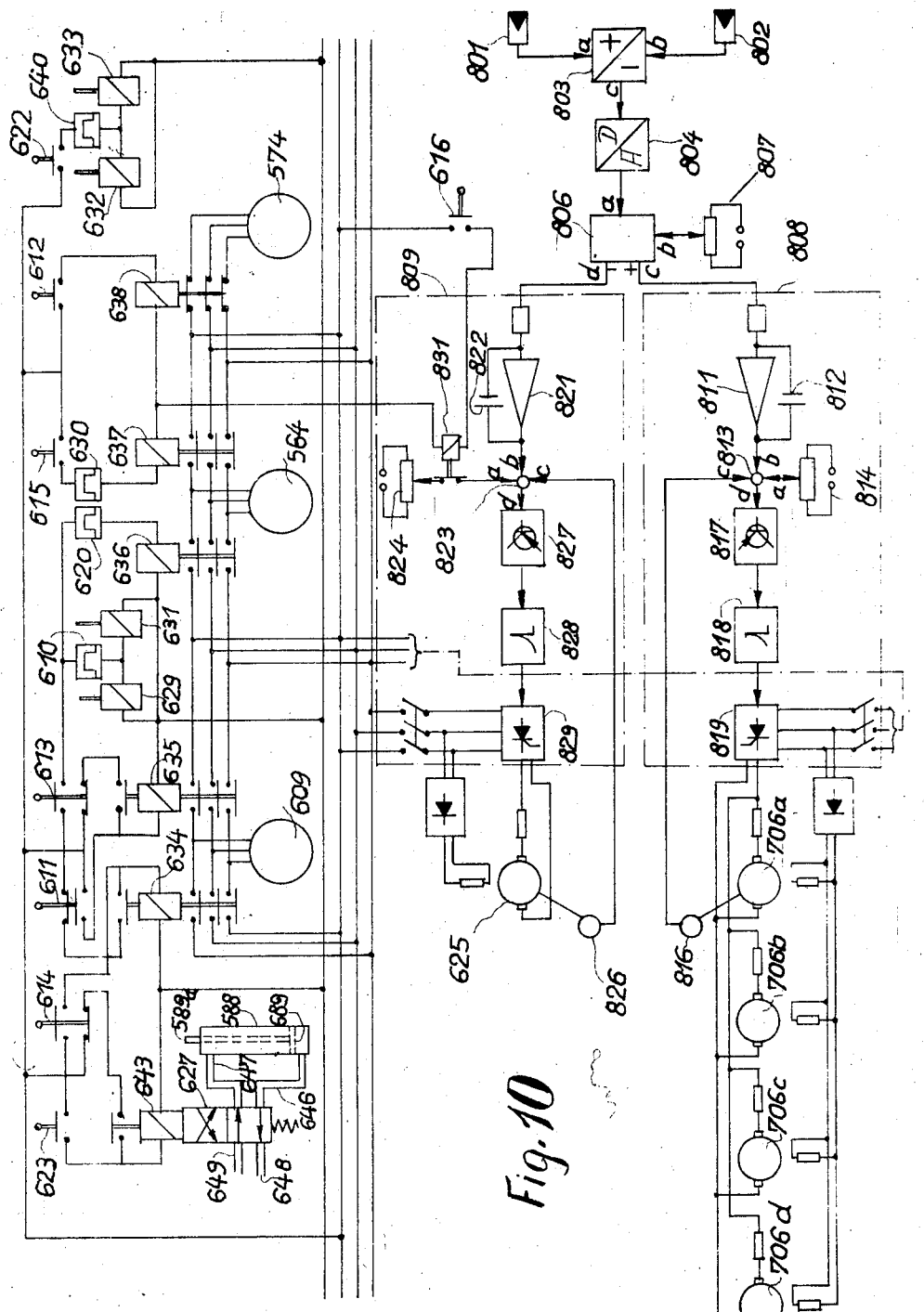
FIG. 10 is a circuit diagram of the control system in the second apparatus.

FIGS. 9 and 10 illustrate certain details of a modified apparatus which differs from the first apparatus mainly in the construction and arrangement of control elements which regulate the speed of the motor of the producing machine and the speed of motors for the consuming machines in dependency on the exact number of filled trays 502b in the storing unit 506. All such parts of the second apparatus which are identical with or clearly analogous to the corresponding parts in the apparatus of FIGS. 1 to 8 are denoted by similar reference characters plus 300. Certain detectors in or at the storing unit 506 are designed to generate signals which are indicative of the exact number of filled trays 502b on the belts 554, 555. The detectors 317, 321 of FIGS. 1 and 8 are replaced with detectors 801 and 802 each of which can comprise a light source and a photosensitive element which produces a signal when the light beam from the respective light source is interrupted or is free to reach the photosensitive surface of the respective photosensitive element. However, it is possible to replace such photoelectric detectors with mechanical detectors.

The detector 801 furnishes a signal whenever a filled tray 502b leaves the loading unit 501 to enter the storing unit 506, and the detector 802 produces a signal whenever a filled tray 502b leaves the storing unit 506 to enter the evacuating unit 503. The detectors 801, 802 respectively transmit signals to the inputs a and b of a forward-rearward signal counter circuit 803 (FIG. 10) which has an output c for transmission of signals to a digital-analog converter 804. The arrangement is such that the signal at the output c of the counter circuit 803 is indicative of the total number of filled trays 502b in the storing unit 506, i.e., the intensity of signal at the output c increases in response to reception of a signal at the input a and the intensity of signal at the output c decreases in response to reception of a signal at the input b. The converter 804 converts the digital electric signal from the counter circuit 803 into an analog electric signal whose intensity increases or decreases stepwise as a function of the rising or decreasing number of filled trays 502b in the storing unit 506.

The output of the converter 804 is connected with the input a of a differential circuit 806 which has a second input b connected with a source 807 of reference signals here shown as a potentiometer which can be adjusted to supply a signal indicating a desirable average number of filled trays 502b in the storing unit 506. The differential circuit 806 has two outputs c and d of which the output c transmits a signal when the difference between the intensities of signals at the inputs b and a is positive and the output d transmits a signal when the difference between the intensities of signals at the inputs b and a is negative. The output c of the differential circuit 806 is connected with a regulating circuit 808 for the variable-speed d-c motors 706a–706d of the four consuming machines, and the output d of the circuit 806 is connected with a regulating circuit 809 for the variable-speed d-c motor 625 of the producing (filter rod making) machine.

The regulating circuit 808 comprises an operational amplifier 811 connected in parallel with a capacitor 812 and having an output which is connected with the input b of a signal comparing junction 813. Another input a of the junction 813 is connected with a source 814 of reference signals here shown as an adjustable potentiometer which serves to produce a signal indicative of the desired rotational speed of the motors 706a–706d. One of the motors 706a–706d (e.g., the motor 706a) drives a tachometer generator 816 which is designed to furnish signals indicating the momentary RPM of the output shaft of the respective motor. A suitable tachometer generator is described and shown in U.S. Pat. No. Re 25,476 to Radley. The signal from the tachometer generator 816 is transmitted to the input c of the junction 813. The output d of the junction 813 transmits a signal which corresponds to the difference between the signal at the input a (from the potentiometer 814) and the sum of signals at the inputs b and c (amplifier 811 and tachometer generator 816). The output d of the junction 813 is connected with the control input of an operational amplifier 819 by way of a preamplifier 817 and a pulse shaper circuit 818. The d-c output of the operational amplifier 819 is in circuit with the variable-speed motors 706a–706d.

The regulating circuit 809 comprises an operational amplifier 822 which is connected with the output d of the differential circuit 806 and is in parallel with a capacitor 822. The output of the amplifier 821 is connected with the input b of a signal comparing junction 823 which has a second input a connected with a source of reference signals in the form of an adjustable amplifier 824. The latter furnishes to the input a a signal which is indicative of the desired operating speed of the motor 625 for the filter rod making machine. The output shaft of the motor 625 drives a tachometer generator 826 which is connected with a third input c of the junction 823 and transmits thereto a signal which indicates the momentary speed of the motor 625. The output d of the junction 823 is connected with the control input of an operational amplifier 829 by way of a preamplifier 827 and a pulse shaper circuit 828. The d-c output of the amplifier 829 is in circuit with the motor 625. The signal at the output d of the junction 823 corresponds to the difference between the signal at the input a (potentiometer 824) and the sum of signals at the inputs b and c (amplifier 821 and tachometer generator 826). The conductor between the potentiometer 824 and the input a of the junction 823 contains the contact of a relay 831 which is energizable in response to actuation of the detector 616. The latter is adjacent to the outlet of the loading unit 501 (see FIG. 9) and is actuated when the storing unit 506 is filled with trays 502b.

The operation of the apparatus shown in FIGS. 9 and 10 is as follows:

The photoelectric detectors 801, 802 respectively produce signals when the storing unit 506 receives and discharges a filled tray 502b. Such signals are respectively transmitted to the inputs a and b of the counter circuit 803 and the signal at the output c of this counter circuit indicates the exact number of filled trays 502b in the storing unit 506.

In the following description of operation of the regulating circuits 808, 809 for the variable-speed motors 706a–706d and 625, it is assumed that the storing unit 506 accommodates an average number (e.g., five) of filled trays 502b. If the evacuating unit 503 receives filled trays 502b at a rate which exceeds the rate of delivery of filled trays from the loading unit 501, for example, because the filter rod making machine is idle or operates at a reduced speed, the signal at the output c of the counter circuit 803 indicates that the number of filled trays 502b in the storing unit 506 has decreased. Therefore, the output c of the differential circuit 806 furnishes a positive signal which is transmitted to the input b of the junction 813 by way of the amplifier 811. This signal opposes the signal which is transmitted to the input a of the junction 813 by the potentiometer 814 so that the signal at the output d of the junction 813 becomes weaker and the amplifier 819 is caused to reduce the voltage of d-c current for the motors 706a–706d. Thus, the operating speed of the consuming machines decreases. The signal from the tachometer generator 816 indicates the momentary speed of the motor 706a (this speed preferably equals the speed of the motors 706b–706d) and is transmitted to the input c of the junction 813; such signal also opposes the signal which is transmitted to the input a by the potentiometer 814 whereby the tachometer generator 816 insures that the motors 706a–706d are actually operated at the speed which is indicated by the signal at the output d of the junction 813. As the rotational speed of the motors 706a–706d decreases, the requirements of the corresponding consuming machines also decrease so that the rate of withdrawal of filled trays 502b from the storing unit 506 is reduced. Thus, the control system of FIG. 10 is capable of automatically regulating the requirements of the consuming machines as a function of the number of filled trays 502b in the storing unit 506, i.e., as a function of changes in the output of the loading unit 501. When the output of the loading unit 501 increases, the intensity of signal at the output c of the counter circuit 803 increases and the intensity of signal at the output c of the differential circuit 806 decreases so that the speed of the motors 706a–706d increases because the intensity of the signal which is transmitted to the input b of the junction 813 decreases. The intensity of the signal at the output d of the junction 813 then increases and the amplifier 819 raises the voltage of d-c current which is supplied to the motors 706a–706d.

If the number of filled trays 502b in the storing unit 506 increases above five (the assumed average number), for example, due to malfunctioning of one or more consuming machines, the output c of the counter circuit 803 transmits a negative signal which causes the differential circuit 806 to change the intensity of signal at the output d. Such signal is transmitted to the input b of the junction 823 in the regulating circuit 809 by way of the amplifier 821 and conteracts the signal from the potentiometer 824 (input a of the junction 823). Thus, the intensity of signal at the output d of the junction 823 decreases and the amplifier 829 is caused to reduce the voltage of d-c current for the motor 625 so that the latter drives the filter rod making machine at a reduced speed and the loading unit 501 turns out filled trays 502b at less frequent intervals. The tachometer generator 826 insures that the rotational speed of the output shaft of the motor 625 is a function of the intensity of signal at the output d of the junction 823.

If the number of filled trays 502b in the storing unit 506 decreases as a result of slower operation of the filter rod making machine, the intensity of signal at the input b of the junction 823 decreases and the intensity of signal at the output d of the junction 823 increases so that the amplifier 829 can raise the voltage of d-c current for the motor 625 and the filter rod making machine starts to turn out filter rod sections 703 at a higher rate so that the loading unit 501 supplies to the storing unit 506 filled trays 502b at shorter intervals.

The operational amplifiers 811, 821 and the parallel-connected capacitors 812, 822 insure smooth changes in the intensity of signals which are transmitted to the inputs b of the junctions 813, 823 in spite of the fact that the intensity of signals at the outputs c and d of the differential circuit 806 changes stepwise. Thus, the speed of the motor 625 and the speeds of motors 706a–706d cannot be changed abruptly to thereby avoid eventual damage to the parts of the respective machines.

When the number of filled trays 502b in the storing unit 506 rises to a predetermined maximum number, the detector 616 (which is adjacent to the outlet of the loading unit 501 as shown in FIG. 9) is actuated by the rearmost (leftmost) filled tray 502b in the storing unit 506 and energizes the relay 831 which disconnects the potentiometer 824 from the input a of the junction 823 in the regulating circuit 809 for the motor 625. The signal at the output d of the junction 823 disappears and the amplifier 829 automatically arrests the motor 625 to stop the filter rod making machine.

The apparatus which is shown in FIGS. 9 and 10 can be used with equal advantage for temporary storage of containers or trays which contain plain cigarettes or filter cigarettes and serve to supply such cigarettes to one or more packing machines. The loading unit 501 is then designed to fill empty trays 502a or analogous containers with plain or filter cigarettes, for example, with filter cigarettes issuing from one of the filter cigarette machines which are driven by the motors 706a–706d. The storing units 506, 507 respectively accommodate filled and empty trays for filter cigarettes and the consuming machines are packing machines which receive filter cigarettes from the evacuating unit 503, i.e., from a unit corresponding to the unit 401 of FIGS. 5 and 6. It is clear that the magazine or hopper which receives filter cigarettes from the receptacle (518 of FIG. 9) can supply filter cigarettes directly into the magazine of a single packing machine so that the filter cigarette making machine or machines which supply filter cigarettes to the belts of the loading unit deliver rod-shaped articles for processing in a single consuming (packing) machine. The detectors corresponding to those shown in FIGS. 9 and 10 then regulate the operation of one or more producing (cigarette making or filter cigarette making) machines as well as the operation of one or more consuming (packing) machines. When the number of filled trays in the corresponding storing unit rises above a desirable number, the operating speed of the producing machine or machines is reduced and the operating speed of the consuming machine or machines is reduced when the supply of filled trays in the corresponding storing unit decreases below the desired average number. Thus, the operating speed of the producing and/or consuming machine or machines can be regulated in dependency on the number of available filled trays in the respective storing unit.

It is further clear that the detectors 801, 802 or analogous detectors can be mounted on or adjacent to the storing unit 507 to regulate the operation of the producing and consuming machines in dependency on the number of available empty trays 502a. The output c of the differential circuit 806 is then connected with the amplifier 821 of the regulating circuit 809 and the output d of the circuit 806 is then connected with the amplifier 811 of the regulating circuit 808.

If the control system of FIG. 10 is to avoid frequent changes in the operational speed of motors 625 and 706a–706d due to constant changes in the number of filled trays 502b in the storing unit 506 or in the number of empty trays 502a in the storing unit 507, the digital-analog converter circuit 804 can be connected in series with a threshold circuit (not shown) so that the signal to the input a of the differential circuit 806 is changed only when the value determined by the setting of the threshold circuit is exceeded, i.e., when the actual number of trays in the storing unit 506 and 507 deviates from the desired number by a certain number (such as by three).

An important advantage of the improved apparatus is that, when the processed rod-shaped articles are filter rod sections of the type wherein a bundle of filamentary material is treated by a plasticizer which requires a certain time for satisfactory setting, the setting of plasticizer can take place while the filter rod sections dwell in the storing unit 206 or 506 and/or in the hopper 204 or 504. Thus, the time during which the filled trays 202b or 502b dwell in the unit 206 or 506 during which the filter rod sections 403 or 703 dwell in the hopper 204 or in the hopper of the transfer unit of the second apparatus is not wasted because the freshly formed filter rod sections should not reach the consuming machine or machines without a certain delay which suffices to insure proper setting of the plasticizer. Therefore, the transfer units of the two apparatus can be properly called processing unit because the filter rod sections in such units undergo a change or treatment (setting of the plasticizer) which must be completed prior to assembly of filter rod sections with cigarette rod sections to form filter tipped smokers' products.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended

1. Apparatus of the character indicated, comprising a first machine for making filter rod sections containing an ingredient the conditioning of which ingredient takes up a predetermined interval of time whereby, after the elapse of said interval, said ingredient enhances the structural stability of filter rod sections; at least one consuming machine for manipulating said filter rod sections; transporting means for delivering filter rod sections from said first machine to said consuming machine, including a loading unit operatively connected with said first machine and having means for filling empty containers with filter rod sections, conveyor means for advancing filled containers to an evacuating station, a magazine for receiving filter rod sections from filled containers at said evacuating station, and at least one pneumatic conveyor for transporting filter rod sections from said magazine to said consuming machine; and means for operating said transporting means at such a speed that the shortest time interval which is required for the transport of filter rod sections from said first machine to said consuming machine exceeds said predetermined interval so that said consuming machine manipulates structurally stable filter rod sections, said conditioning occurring during the filter rod section transport from said first machine to said consuming machine which facilitates its handling characteristics thus reducing the likelihood of damage to said rod sections.

2. Apparatus as defined in claim 1, wherein said conveyor means is arranged to advance empty containers from said evacuating station to said loading unit and comprises first and second storing means respectively arranged to accommodate supplies of empty and filled containers, said first and second storing means respectively comprising first and second conveyors operable independently of each other to respectively transport empty containers toward said loading unit and filled containers toward said evacuating station, and further comprising a transfer device for feeding filter rod sections from said magazine into said pneumatic conveyor.

3. Apparatus as defined in claim 2, wherein said conveyor means further comprises signal generating detector means provided in at least one of said storing units and arranged to furnish signals indicative of the presence or absence of containers in said one storing unit.

4. Apparatus as defined in claim 3, wherein said detector means includes two discrete detectors one of which is arranged to produce signals in response to removal of containers from said one storing unit and the other of which is arranged to produce signals in response to introduction of containers into said one storing unit.

5. Apparatus as defined in claim 2, wherein the filling means of said loading unit comprises row forming means for assembling rows of filter rod sections, means for transporting empty containers past said row forming means, and means for transferring rows of filter rod sections from said row forming means into such empty containers.

6. Apparatus as defined in claim 2, wherein said transporting means further comprises a third conveyor operable to transport containers from said first storing unit past said filling means of said loading unit, a fourth conveyor operable to transport containers from said second storing unit to said evacuating station, and detector means adjacent to said conveyors of said conveyor means and actuatable by containers on the respective conveyors to produce signals for controlling the operation of said conveyors of said conveyor means.

* * * * *